United States Patent [19]

Minet et al.

[11] Patent Number: 4,692,306

[45] Date of Patent: Sep. 8, 1987

[54] CATALYTIC REACTION APPARATUS

[75] Inventors: Ronald G. Minet, South Pasadena; David Warren, Studio City, both of Calif.

[73] Assignee: Kinetics Technology International Corporation, Monrovia, Calif.

[21] Appl. No.: 842,830

[22] Filed: Mar. 24, 1986

[51] Int. Cl.[4] .............................. B01J 7/00; B01J 8/06
[52] U.S. Cl. .......................................... 422/49; 48/94; 422/197; 422/198; 422/211
[58] Field of Search ............... 422/146, 196, 197, 198, 422/211, 79; 48/94, 95, 105, 196 A, 204 A

[56] References Cited

U.S. PATENT DOCUMENTS

| 1,478,550 | 12/1923 | Casale | 422/148 |
| 1,832,972 | 11/1931 | Ernst | 422/148 |
| 4,098,587 | 7/1978 | Krar et al. | 48/94 |
| 4,203,950 | 5/1980 | Sederquist | 422/211 |

FOREIGN PATENT DOCUMENTS 827928 5/1981 U.S.S.R. .............................. 422/197

Primary Examiner—Barry S. Richman
Assistant Examiner—William R. Johnson
Attorney, Agent, or Firm—William W. Haefliger

[57] ABSTRACT

A compact concentric-tube catalytic reaction apparatus for converting distillable hydrocarbon feedstock or methanol to useful industrial gases, such as hydrogen and carbon monoxide, comprises an annular reaction chamber concentrically disposed around an internal burner chamber. An infrared burner assembly vertically disposed within the burner chamber provides a uniformly radiating source for heat transfer to the reaction chamber. The burner chamber employs a convective section of enhanced thermal efficiency. The present invention eliminates the problems of flame impingement and local heat maldistribution associated with compact designs employing flame burners directly radiating to the reaction chamber wall.

17 Claims, 3 Drawing Figures

CATALYTIC REACTION APPARATUS

BACKGROUND OF THE INVENTION

1. Field of Invention

This invention relates to catalytic reaction apparatus such as for producing product gases from a feedstock.

2. Description of Prior Art

Catalytic reaction apparatus, such as for converting hydrocarbon feedstocks to useful industrial gases, for example hydrogen, is well known in the art. In this regard, commercial production of hydrogen from hydrocarbon feedstocks is most commonly achieved by passing a mixture of steam and hydrocarbon through catalyst filled reactor tubes vertically supported within a furnace chamber.

In commercial steam reformers endothermic heat is commonly supplied by the combustion of fuel and oxidant in a diffusion flame burner which radiates heat to the refractory furnace walls, heating them to incandescence, and thereby providing a radiant source for heat transfer to the reactor tubes. Uniform radiation to the reactor tubes is critical since excessive local heating of a reactor tube wall will result in diminished life expectancy for the reactor apparatus.

Portions of the reactor tube which are in direct line of sight with the burner flame, which are impinged by the burner flame, or which are too closely spaced to the radiating refractory, will become hotter than the remaining portions.

In large-scale commercial steam reformers, maldistribution of heat within the furnace chamber is minimized by providing large spacing between individual reactor tubes, the furnace walls, and the burner flames. However, for small scale catalytic reaction apparatus which is uniquely compact, special design features must be employed.

In the prior art U.S. Pat. No. 4,098,587 to Kral el al, there is described a compact reformer comprising a plurality of reactor tubes disposed within the combustion volume of a furnace. Baffles, such as sleeves, are disposed around portions of the reactor tubes to shield the tubes from excessive radiant heat from the walls of the furnace and to more evenly distribute heat among and around all of the reactors. It is therein described that the use of such baffles allows close spacing between reactor tubes while simultaneously avoiding excessive local heating of reactor tube walls. In the present invention, uniform radiant heat distribution to the reactor tube walls is achieved through the use of an annular reaction chamber concentrically disposed around an internal burner chamber containing a uniformly radiating infrared burner. This configuration is in contradiction to the prior art U.S. Pat. No. 4,098,587 which teaches the use of reactor tubes disposed within a furnace volume and surrounded by baffles.

The catalytic reaction apparatus as embodied in the present inenvtion achieves the objects of compact design and long life expectancy by application of a novel burner chamber configuration which prevents flame impingement or direct line-of-sight between burner flame and reaction chamber, and which provides a means for uniformly distributing heat along the axial and circumferential dimensions of the reactor.

SUMMARY OF THE INVENTION

It is the general object of the present invention to provide a novel catalytic reaction apparatus for the production of industrial gases from a hydrocarbon or methanol feedstock which is simulataneously compact, has improved life expectancy, has rapid response, and is hgihly efficient. The subject invention is particularly well suited for small scale generation of industrial gases.

Improved life expectancy is achieved by configuring the reaction apparatus such that the heat release pattern within the burner chamber is uniformly distributed along the circumferential and axial dimensions of the reaction chamber, overcoming the problem of non-uniform heat release which contributes to excessive local heating of the reaction chamber wall, thereby diminishing life expectancy for the reaction apparatus. The design of a reaction apparatus with provisions for uniform heat release, in particular a compact apparatus, requires special considerations. Thus, in contradistinction to applications where compactness is not a primary requirement, such as for most large scale commercial steam reforming furnaces, the reaction chamber must be closely spaced from the burner flame. Under these conditions, portions of the reaction chamber nearest the burner flame receive an excessive amount of radiation resulting in the occurrence of local hot spots on the reaction chamber wall, thereby reducing the expected life of the reactor.

In the present invention, a compact burner chamber employing an infrared burner assembly is configured to more uniformly distribute radiant energy along the axial and circumferential dimension of the reaction chamber wall.

Heat released by the combustion of fuel and oxidant is used to heat a ceramic surface centrally disposed within an annular reaction chamber. The heated ceramic surface serves to uniformly distribute radiant energy to the reaction chamber wall, thereby minimizing local maldistribution of heat within the burner chamber and avoiding the problem of direct flame impingement on the reaction chamber wall.

In one embodiment, the infrared burner assembly comprises a porous ceramic fiber burner which permits the efflux of fuel and oxidant from the burner core to the outer surface of the ceramic fiber. The properties of the ceramic fiber serve to stabilize the combustion reaction in a shallow zone proximal to the outer surface of the ceramic fiber. The combustion reaction heats the ceramic fiber to incandescence permitting uniform radiation of energy to the reaction chamber.

In another embodiment, the infrared burner assembly comprises an indirectly fired, non-permeable, ceramic conduit. Fuel and oxidant are combusted in a diffusion flame disposed within the burner core. Radiation from the flame and hot burner gases heat the ceramic conduit to incandescence, thereby permitting uniform radiation to the reaction chamber.

The lower portions of the burner chamber are typically configured to form a convective chamber for enhancing heat transfer from the burner gases to the lower portions of the reaction chamber.

The reaction chamber, which is substantially filled with a catalyst, is typically substantially concentrically disposed around the burner chamber, defining an annualr passageway for the contact of reactant gases over the catalyst.

A wall conduit is typically substantially concentrically disposed around the reaction chamber defining an annular passageway therebetween for the flow of hot product gases exiting the reaction chamber. The hot product gases flow countercurrently against reactant gases, thereby releasing sensible heat to the endothermic reaction.

The foregoing and other objects features, and advantages, of the present invention will become more apparent in the light of the following detailed description of preferred embodiments.

DESCRIPTION OF THE PREFERRED EMBODIMENT

Figure 1:
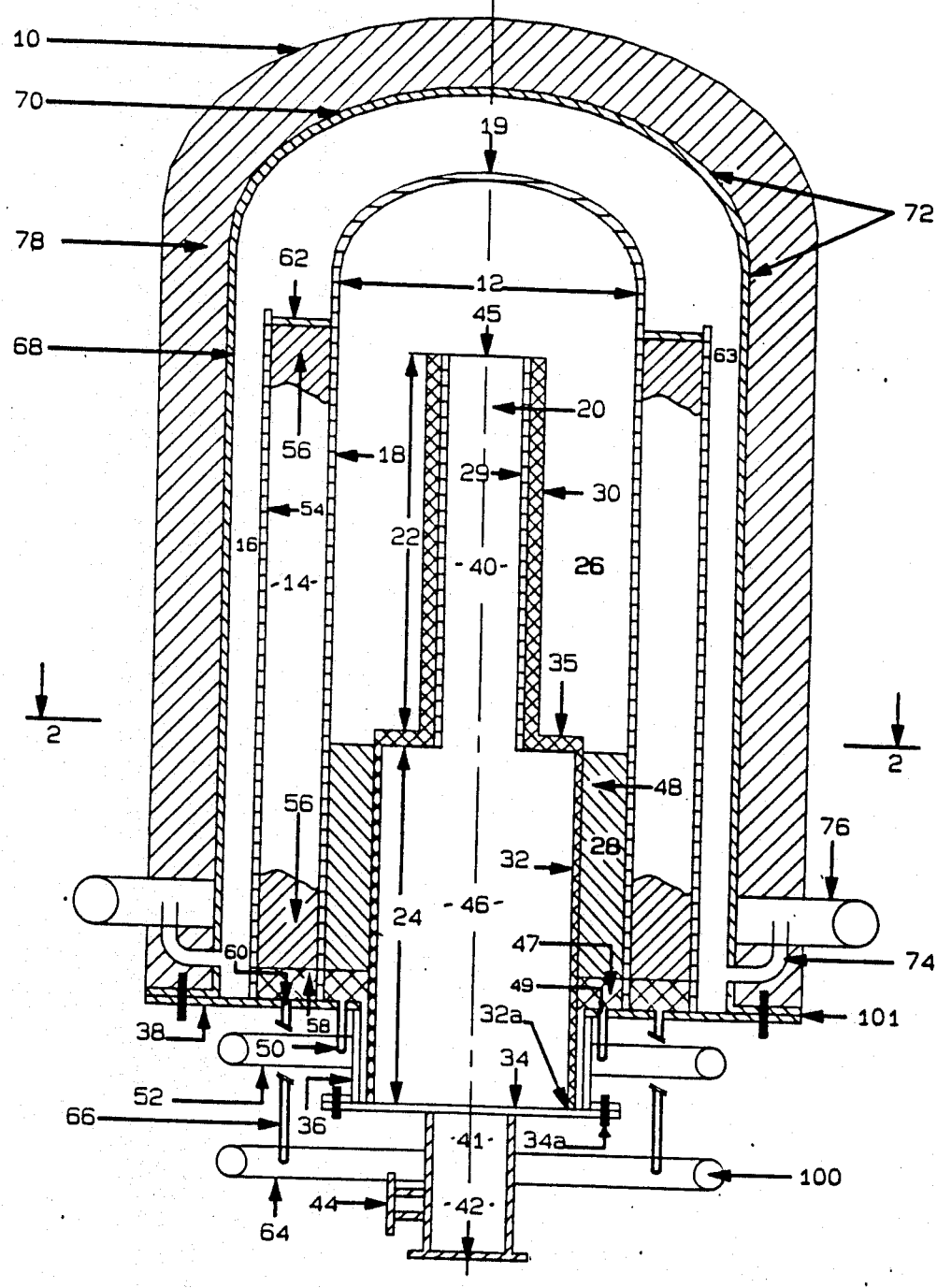
FIG. 1 is a vertical, cross-sectional view of the catalytic reaction apparatus according to the present invention.
Figure 2:
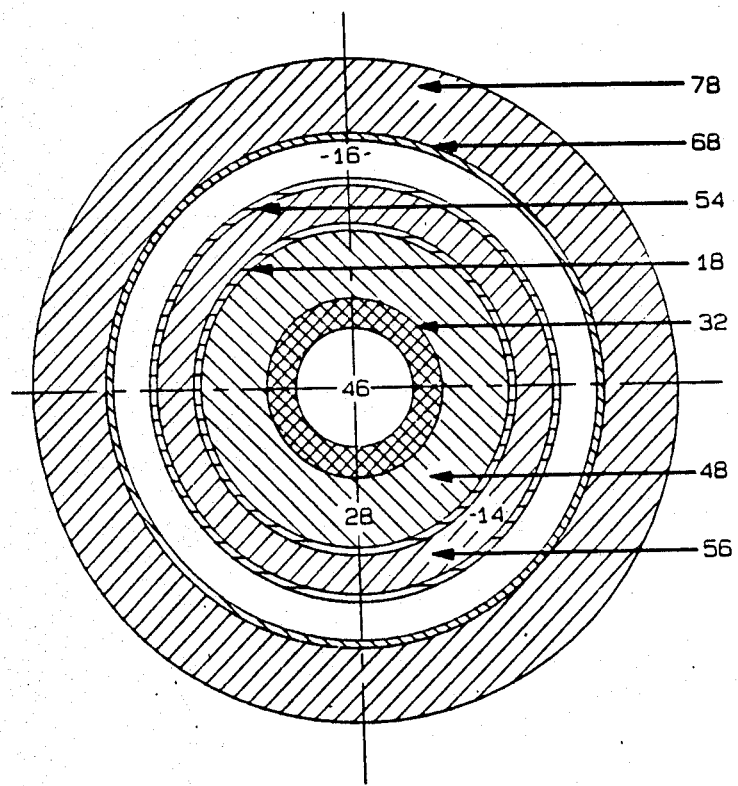
FIG. 2 is a horizontal, cross-sectional view of FIG. 1 taken along lines 2—2 of FIG. 1.

The catalytic reaction apparatus 10 of FIGS. 1 and 2 depicts the preferred embodiment of the present invention. The apparatus comprises several primary chambers including a burner chamber 12, a reaction chamber 14, and a regenerative heat transfer chamber 16.

The burner chamber 12 is defined by the volume within or fully enclosed by the reaction chamber wall 18, the burner chamber upper end wall 19, the reactor base plate 38, and the burner assembly nozzle 36. An axially extending infrared burner assembly 20 is centrally disposed within the burner chamber 12. The infrared burner assembly may be considered to comprise an upper portion, hereinafter referred to as the radiant burner 22, and a lower portion hereinafter referred to as the burner stock 24.

The burner chamber may also be considered to comprise an upper portion hereinafter referred to as the radiant chamber (i.e. sub-chamber) 26 and a lower portion hereinafter referred to as the convection chamber (i.e. sub-chamber) 28. The radiant chamber 26 comprises an annular passageway or zone defined by the volume enclosed by the reaction chamber upright wall 18 and the radiant burner upright skin or porous shell 30. The convection chamber 28 comprises an annular passageway or zone defined by the volume enclosed by the reaction chamber wall 18 and the burner upright stock wall or shell 32. The latter typically is of larger diameter than shell 30.

In this embodiment, the burner stock 24 may be secured at its base by means of welded attachment 32a to the burner assembly horizontal blind flange 34. The latter is secured to the burner chamber nozzle 36 by means of bolted attachment at 34a, permitting free disengagement of the infrared burner assembly 20 from the burner chamber 12. The burner assembly nozzle 36 is typically secured to the reactor base plate 38 by means of welded attachment at 36a.

The axially extending, vertically disposed radiant burner 22 is supported at its base by annular top wall 35 of the burner stock 24. In this embodiment, the radiant burner 22 is comprised of a gas permeable internal structure 29 fully surrounded or enclosed by a layer of porous ceramic fiber hereinafter referred to as the radiant burner skin 30. The gas permeable internal structure 29 typically comprises a metallic screen or wire mesh. The empty volume enclosed by the gas permeable internal structure 29 is hereinafter referred to as the radiant burner core 40, and which extends the length of the internal structure 29, and fills the space surrounded by the internal structure.

In this embodiment, burner air is introduced to the burner assembly through a burner air inlet nozzle 42 attached to the burner assembly blind flange 34. Burner fuel is introduced into the burner assembly through a burner fuel nozzle 44 attached to the burner air nozzle 42, to mix with air in zone 41.

Premixed burner air and burner fuel upwardly enters the burner stock chamber 46 and thereupon passes into the radiant burner core 40. The air and fuel mixture effuses laterally through the radiant burner skin 30, whereupon the combustion reaction occurs in a shallow zone proximal to the outer surface of the skin. The combustion reaction heats the radiant burner skin 30 to incandescense, thereby providing a means for uniform or substantially uniform radiant heat transfer laterally to the reaction chamber upright wall 18, and generally throughout the vertical length of the skin. It should be noted that the burner upper end plate 45 is constructed from non-gas permeable material to prevent excessive radiation to the burner chamber end cap 19.

The unit radial pressure drop through the radiant burner skin 30 is considerably greater than the unit axial pressure drop through the burner core 40, thereby ensuring an even distribution of gaseous air and fuel mix supply across the axial dimension of the radiant burner 22, and about the circumferential extent of same. The combustion reaction is stabilized within the radiant burner skin 30 due to the back-conduction of heat released on the skin outer surface. Flashback is prevented by the counteracting effect of heat removal from inner surface of the radiant burner skin 30 due to the convective flow of the inflowing air and fuel mixture. Burner gases effusing through the radiant burner skin 30 thereupon flow downwardly as exhaust gases via the open radiant chamber 26 to the convection chamber 28.

The annular passageway of the convection chamber 28 is substantially filled with a heat transfer packing material 48 configured to increase the effectiveness of convective heat transfer from the burner gases to the lower portions of the reactor chamber wall 18. The heat transfer packing material 48 is supported at the bottom of the convection chamber 28 by means of an annular screen 47. Typical heat transfer packing materials include metallic mesh, and ceramic spheres, rods, or rings as are employed in the industry.

Burner exhaust gases exiting the lower portion of the convection chamber 28 are collected at the gas exit 49 by means of a circumferential series of burner gas outlet conduits 50 extending through and protruding from the reactor base plate 38. The outlet conduits 50 are disposed radially and circumferentially to correspond with the union of the annular passageway of the convection chamber 28 and the reactor base plate 38. A sufficient number of conduits 50 are employed to ensure uniform distribution of the burner gases within the convection chamber 28. Conduits 50 are individually extended from the reactor base plate 38 to connect with manifold 52 circumferentially disposed below the reactor base plate, thereby providing a substantial conduit for the flow of gases from the catalytic reaction apparatus 10.

So arranged, the burner chamber provides a means for efficiently supplying endothermic heat reaction to the reaction chamber wall 18. The compactly disposed upright radiant burner 22 provides a uniform and substantial source of radiant heat energy for wall 18, while avoiding the problems of flame impingement and local heat maldistribution common among conventional flame burners. The convection chamber 28 provides a means for enhanced heat recovery, thereby maximizing the thermal efficiency of the catalytic reaction apparatus 10. Furthermore, the centrally disposed burner assembly provides a means for substantially isolating the hot burner gases from the environment thereby minimizing undesirable system heat losses which become increasingly significant for compact apparatus with large surface to volume ratios.

An axially extending wall conduit, hereinafter referred to as the reaction chamber outer wall 54, is concentrically disposed around the reaction chamber inner wall 18, thereby defining an annular volume or zone 14 therebetween referred to as the reaction chamber 14. Inner wall 18 and outer wall 54 are individually secured to reactor base plate 38 as by means of welded attachment. In this embodiment, chamber 14 is substantially filled with steam reforming catalyst pellets 56 which are supported on a screen 58 disposed at the inlet end 60 of the reaction chamber. To prevent fluidization of the steam reforming catalyst pellets 56 due to the up-flow of reactants, the catalyst is contained at the reaction chamber outlet means of a containment screen 62. The reaction chamber outlet 61 is in gas communication with the regenerative heat transfer chamber inlet 63, thereby permitting the up-flow of hot product gases from the reaction chamber 14 to the regenerative heat transfer chamber 16, wherein the product gases flow downwardly. In a separate embodiment, the upper portion of the reaction chamber outer wall 54 may be partially extended over the burner chamber end cap 19 thereby directing a flow of product gases over the burner chamber end cap 19 to provide convective cooling and to minimize the formation of quiescent zones thereabove.

The feed reactant mixture supplied at 100 enters the reactant gas manifold 64, whereupon the reactant mixture is uniformaly distributed to the reaction chamber inlet 60 by means of a series of reactant gas inlet conduits 66 terminating at and through the reactor base plate 38, and disposed radially and circumferentially to correspond with the union of the annular passageway of the reactant chamber 14 and the reactor base plate.

An axially extending wall conduit, hereinafter referred to as the regenerative heat transfer chamber outer wall 68, is concentrically disposed around the reaction chamber outer wall 54 thereby defining an annular volume or zone therebetween referred to as the regenerative heat transfer chamber 16. The chamber 16 is enclosed at its upper end by a reactor end cap 70 and its lower end by joindure or intersection at 101 with the reactor base plate 38. Wall 68 is typically secured to the reactor base plate by means of a bolted attachment. The wall 68 and the reactor cap 70 may be considered to form the outer shell 72 of the catalytic reaction apparatus 10. So arranged, the shell 72 may be freely axially disengaged and remove from the remainder of the catalytic reactor apparatus permitting inspection, removal and replacement of the steam reforming catalyst pellets 56 and other reactor internals.

The regenerative heat transfer chamber 16 being in gas communication with the reaction chamber 14 receives hot product gases at its upper portion. The hot product gases flow downward through the regenerative heat transfer chamber 16 releasing sensible heat to the reaction chamber outer wall 54 thereby providing endothermic reaction heat to the counter current flowing reactant mixture within the reaction chamber 14.

Product gases exit the regenerative heat transfer chamber 16 at its lower portion through a series of product gas outlet conduits 74 circumferentially disposed around the lower perimeter of the regenerative heat transfer chamber outer wall 68. The product gas outlet conduits 74 extends to the product gas manifold 76 circumferentially disposed around the regenerative heat transfer chamber outer wall.

The reactor outer shell 72 is substantially isolated from the ambient environment by means of an insulating layer 78 thereby minimizing heat losses from the reactor. The reactor base plate 38, the burner gas manifold 52, the product gas manifold 76, the reactant gas manifold 64, and other hot surfaces may be similarly heat insulated.

In operation, a gaseous mixture of steam and a reformable feedstock enters the reactant mixture manifold 64, whereupon the gas is uniformly distributed to the reaction chamber inlet 14 through a series of reactant gas inlet conduits 66. The gas mixture flows upward through the annular volume of the reaction chamber, reacting in the presence of the steam reforming catalyst pellets 56 to produce hydrogen, carbon monoxide and other product gases. In the lower portions of the reaction chamber 14, endothermic reaction heat is supplied primarily by means of convective heat transfer from the burner gases flowing countercurrently through the convection chamber 28. In the upper portions of the reaction chamber 14, endothermic heat is supplied primarily by radiative heat transfer from the radiant burner skin 30 to the reaction chamber inner wall 18. Additional heat is supplied to the reactant gas mixture by convective heat transfer from the hot product gases flowing countercurrently through the regenerative heat transfer chamber 16.

As the reactant gas mixture travels upward within the reaction chamber 14, it continues to react and absorb heat, reaching a maximum temperature and conversion level at the reaction chamber outlet 61. The hot product gases enters the regenerative heat transfer chamber inlet 63 and thereupon traverses the length of the annular volume transferring heat therefrom back into the reaction chamber 14.

Fuel enters the burner assembly 20 via the burner fuel inlet nozzle 44 whereupon it is mixed with combustion air entering the burner air nozzle 42. The fuel and air mixture flows through the burner stock 46 and into the burner core 40 thereupon effusing through the radiant burner skin 30. Combustion of the fuel and air mixture occurs in a shallow zone proximal to the outer layer of the radiant burner skin 30 thereby heating its surface and providing a uniform, radiant source for transferring heat to the reaction chamber inner wall 18. Burner gases entering the radiant chamber 26 from the radiant burner skin 30 flows downward through the convection chamber 28 thereby providing additional reaction heat to the lower portions of the reaction chamber inner wall.

The present invention permits a particularly compact arrangement for the burner chamber 12, reactor chamber 14, and the regenerative heat transfer chamber 16. The burner chamber is configured to provide a uniform distribution of heat to the reaction chamber wall 18. The present invention eliminates the problems of flame impingement and local heat maldistribution common among compact flame burner arrangements thereby providing extended life expectancy and improved performance for the catalytic reaction apparatus. Since the heat capacity of the internal burner assembly 20 and burner chamber 12 is substantially less than that of a furnace box lined with thick refractory material, the present invention is adapted to provide an apparatus with a particularly rapid start-up and turndown response. The combination of radiant and convective heat transfer in the burner chamber 12 coupled with additional heat recovery in the regenerative heat transfer chamber 16 is also adapted to provide for a high thermal efficiency. The catalytic reacton appartus is designed with easily removable components for ease of maintenance and access to catalyst, burner, etc. Also, the apparatus is designed so that each primary wall means is free standing, self supporting, and fixed only at one end, thereby minimizing thermal stresses during the thermal expansion.

It should be apparent that the gas manifolding arrangements for the reactant gases, product gases, burner fuel, burner air, and burner gases shown in FIG. 1 are by way of example and are not critical to the present invention. It should also be apparent that the invention is not limited to the steam reforming reaction and could apply equally well to other endothermic reactions such as methanol or ammonia dissociation.

Figure 3:
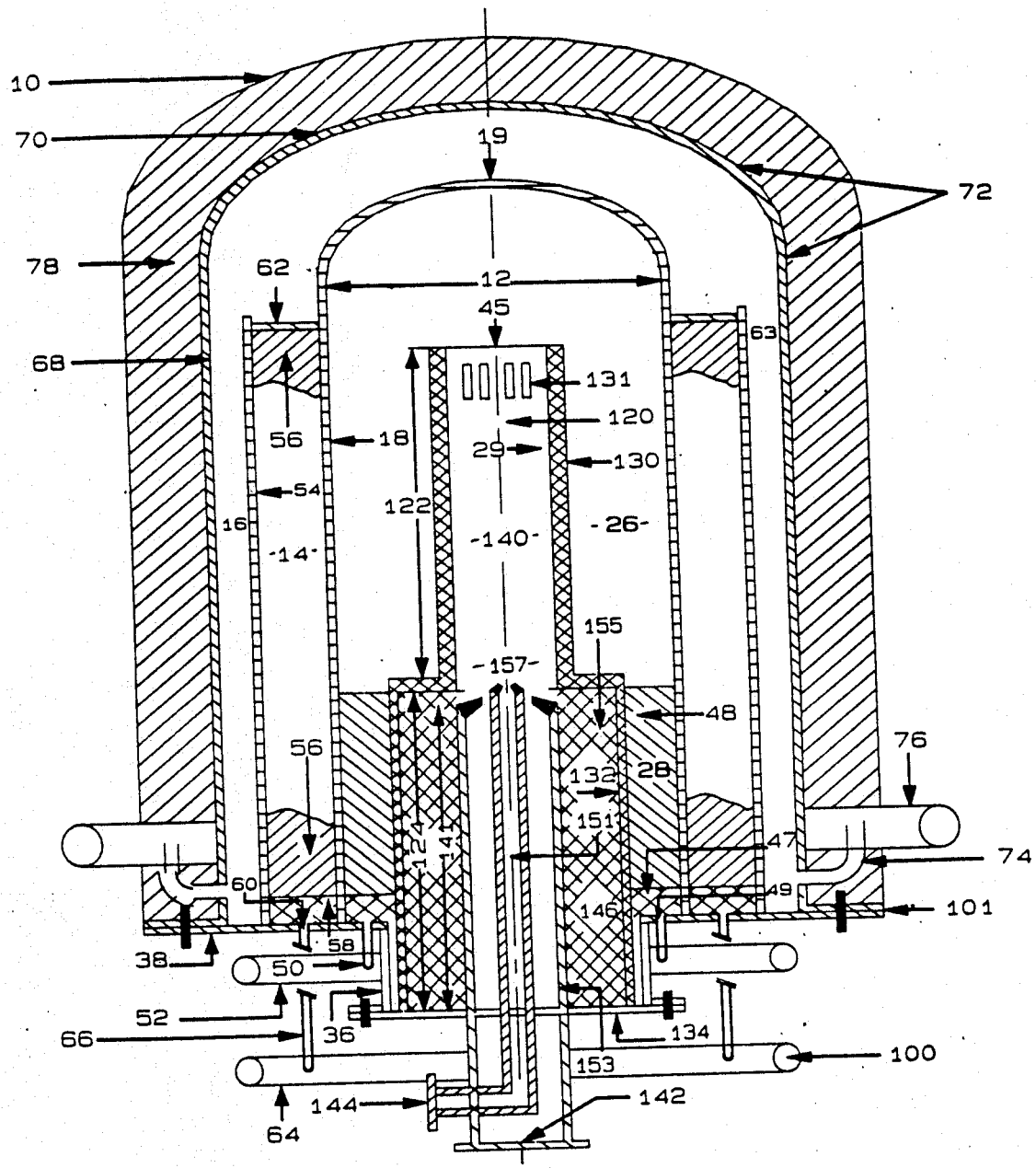
FIG. 3 is a vertical, cross-sectional view of catalytic reaction apparatus showing another embodiment of the present invention.

FIG. 3 depicts another embodiment of the present invention. Similar reference numerals represent components which are the same as those in FIG. 1. In this embodiment the burner assembly 120 may be considered to comprise an upper portion hereinafter referred to as the radiant burner 122 and a lower portion hereinafter referred to as a burner stock 124. The radiant burner 122 is diposed in the upper portion of the burner chamber 12 hereinafter referred to as radiant chamber 26. As in the preferred embodiment, the space between the lower portion of the reactor chamber inner wall 18 and the burner stock wall 132 defines an annular passageway hereinafter referred to as the convection chamber 29.

In this embodiment, an axially extending burner tip assembly 141 is centrally disposed within the burner stock chamber 146. The burner tip assembly comprises a cylindrical, burner fuel supply conduit 151. Concentrically disposed within a cylindrical burner air conduit 153. The burner tip assembly 141 is secured to the burner assembly blind flange 134 and includes inlet means 144 introducing burner fuel to the burner fuel supply conduit 151 and inlet means 142 for introducing burner air to the burner air supply conduit 153. The annular volume between the burner stock wall 132 and the burner air supply conduit 153 is substantially filled with insulating material 155. Combustion of burner air and burner fuel at the burner tip forms an attached diffusion flame directed vertically upward within the radiant burner core 140.

The radiant burner 122 is comprised of an axially extending ceramic conduit, hereinafter referred to as the radiant skin 130, which is substantially non-permeable to gases and which is vertically disposed within the radiant chamber 26 and supported at its base by the burner stock 125. The volume enclosed by the radiant skin 130 defines the radiant burner core 140 through which flows hot burner gases. The radiant burner 122 includes outlet means 131 for hot burner gases exiting the upper portion of the radiant burner. The attached flame at the burner tip 157 and the resulting hot burner gases radiate energy to the radiant skin 130, thereby heating it to high temperatures. The heated radiant skin 130, thereupon uniformly re-radiates heat energy to the reaction chamber wall 18 thereby providing endothermic reaction heat to the reaction chamber 14.

Burner gases exiting the radiant burner core at outlet means 131 enter the radiant chamber 26 and thereupon flow into the convection chamber 28 which is in gas communication. As in the preferred embodiment, the convection chamber 28 is substantially filled with a packing material 48 for enhancing the effectiveness of convective heat transfer from the burner gases to the lower portion of the reaction chamber wall.

So arranged, the burner chamber provides a means for efficiently supplying endothermic heat to the reaction chamber 14. The ceramic radiant burner 120 serves to protect the reaction chamber wall 18 from direct view of the burner flame, and to more uniformly distribute the burner gas heat release within the axial and circumferential dimension of the radiant chamber 26, thereby minimizing local hot spots on the reaction chamber wall 18 and thus extending life expectancy for the catalytic reaction apparatus 10.

Thus is should be apparent to those skilled in the art that the subject invention accomplishes the objects set forth above. Although in this specification the preferred embodiment of the subject invention is described in detail, it is to be understood that the subject invention is not limited by the example set forth herein and that the scope of the invention includes all modification, variations, and equivalent embodiments that fall within the scope of the attached claims.

We claim:

1. Endothermic catalytic reaction apparatus comprising:
   (a) an axially extending reaction chamber, and an axially extending regenerative heat transfer chamber,
   (b) an internally disposed, axially extending burner chamber about which the reaction chamber extends, the burner chamber containing an infrared burner assembly, means defining a radiant chamber, and means defining a convection chamber wherein said burner chamber supplies endothermic reaction heat to the reaction chamber, said burner chamber defined by a generally cylindrical inner wall means of said reaction chamber, said burner chamber also including burner gas exhaust means associated therewith,
   (c) said axially extending reaction chamber being disposed generally concentrically about said burner chamber, said reaction chamber defined by said inner wall means which is exposed to burner gases within said burner chamber and also by a generally concentric cylindrical outer wall means exposed to hot product gases within said regenerative heat transfer chamber, there being a first space between said reaction chamber inner and outer wall means defining a generally annular chamber which is substantially filled with catalyst and which is a passageway for conducting reactant gases over said catalyst,
   (d) said axially extending regenerative heat transfer chamber disposed in a generally concentric arrangement about said reaction chamber, said regenerative heat transfer chamber defined by said outer wall means of the reaction chamber and by a generally concentric cylindrical outer shell means of the catalytic reaction apparatus, there being a second space between said outer wall means and said outer shell means defining a generally annular passageway for flow of said hot product gases, (e) said infrared burner assembly comprising an upper radiant burner portion and a lower burner stock portion, said radiant burner portion being vertically disposed within said radiant chamber of the burner chamber, and said burner stock portion defining an inner wall means of said convection chamber, (f) and wherein said radiant burner portion comprises a gas permeable support structure having an internal volume defining a burner core and wherein said support structure includes a ceramic fiber material defining a radiant skin enclosing a substantial portion on said support structure.

2. The reaction apparatus according to claim 1, wherein said radiant skin is configured to allow efflux of fuel and oxidant from the burner core to the radiant chamber, resulting in a stable combustion reaction in a shallow layer proximal to the outer surface of the radiant skin, said combustion reaction heating said radiant skin to incandescence, thereby providing a source of uniform radiant heat to said inner wall means of the reaction chamber.

3. The reaction apparatus according to claim 1 wherein said radiant skin is substantially uniformly spaced from said reaction chamber inner wall means for defining an annular burner gas passageway therebetween.

4. The reaction apparatus according to claim 1 wherein said convection chamber comprises an annular passageway substantially filled with a packing material for enhancing convective heat transfer from said burner gas to said reaction chamber and being defined by said inner wall means of the reaction chamber and wall means of said burner stock.

5. The reaction apparatus according to claim 1 further including burner chamber nozzle means which is attached to said infrared burner assembly by bolted flange means so as to permit detachment of said infrared burner assembly from said burner chamber, said infrared burner assembly also including inlet means for introducing fuel and oxidant into a core defined within the burner assembly.

6. The reaction apparatus according to claim 1 wherein said reaction chamber includes inlet means for introducing reactant gases into a lower portion of said reaction chamber, and outlet means for permitting the exit of hot product gases from an upper portion of said reaction chamber, the upper portion of said reaction chamber being in gas communication with the upper portion of said regenerative heat transfer chamber.

7. The reaction apparatus according to claim 1 wherein said regenerative heat transfer chamber includes inlet means for receiving hot product gases, and outlet means for permitting exit of product gases from a lower portion of said regenerative heat transfer chamber.

8. Endothermic catalytic reaction apparatus comprising:

(a) an axially extending reaction chamber, and an axially extending regenerative heat transfer chamber, (b) an internally disposed, axially extending burner chamber comprising an infrared burner assembly, means defining a radiant chamber, and means defining a convection chamber wherein said burner chamber supplies endothermic reaction heat to the reacton chamber, said burner chamber defined by a generally cylindrical inner wall means of said reaction chamber, said burner chamber also including burner gas exhaust means associated therewith, (c) said axially extending reaction chamber being disposed generally concentrically about said burner chamber, said reaction chamber defined by said inner wall means which is exposed to burner gases within said burner chamber and also by a generally concentric cylindrical outer wall means which is exposed to hot product gases within a regenerative heat transfer chamber, there being a first space between said reaction chamber inner and outer wall means defining a generally annular chamber which is substantially filled with catalyst and which is a passageway for conducting reactant gases over said catalyst, (d) said axially extending regenerative heat transfer chamber disposed in a generally concentric arrangement about said reaction chamber, said regenerative heat transfer chamber defined by said outer wall means of the reaction chamber and by a generally concentric cylindrical outer shell means of the catalytic reaction apparatus, there being a second space between said outer wall means and said outer shell means defining a generally annular passageway for flow of said hot product gases, (e) said infrared burner assembly comprising an upper radiant burner portion and a lower burner stock portion, said radiant burner portion being vertically disposed within said radiant chamber of the burner chamber, and said burner stock portion defining an inner wall means of said convection chamber, said radiant burner portion comprising a cylindrical non-permeable ceramic burner gas conduit defining a radiant skin having an internal volume defining a burner core, said burner core receiving hot burner gases from combustion at a burner tip disposed within said burner core, said radiant burner portion including outlet means for burner gases exiting to said radiant chamber.

9. The reaction apparatus according to claim 8 wherein said radiant skin is configured to absorb heat from flame and from burner gas within said burner core, heating the radiant skin to incandescence and thereby providing a substantially uniform radiant source for heat transfer to inner wall means of the reaction chamber.

10. A catalytic reaction apparatus comprising:

(a) an upright burner chamber, and an upright infrared burner assembly therein, (b) an upright inner wall within said burner chamber and surrounding the burner assembly and spaced therefrom to receive radiant heat transfer from the burner, (c) and means including a catalyst bed located about said inner wall to receive a supply of feed gas to be heated by heat transfer from said wall to said bed, for reaction of said feed gas and subsequent removal of the gas from said apparatus, (d) wherein the burner includes an outlet means for burner exhaust gases located to cause exhaust flow thereof downwardly in a space between said upright inner wall and the burner chamber to convectively heat said inner wall, (e) the burner chamber including an upper radiant sub-chamber, and a lower convection sub-chamber; and the burner assembly also including a radiant burner in the upper sub-chamber, and a burner stock in the lower sub-chamber, said radiant burner including a porous ceramic fiber upright outer skin, and a gas permeable core surrounded by the skin, said radiant burner having an upper discharge means.

11. The combination of claim 10 wherein the permeable core is defined by the skin, and is characterized by a unit vertically axial pressure drop less than the unit radial pressure drop of the skin, ensuring an even distribution of the air and fuel mix supply along the axial dimension of the skin, and also ensuring even combustion close to the skin followed by downward flow of exhaust gases to said lower sub-chamber.

12. The combination of claim 10 wherein said lower sub-chamber contains heat transfer packing for transferring heat to the reaction chamber wall, and further including exhaust gas outlets to remove exhaust gases from said packing for removal from said apparatus.

13. The combination of claim 10 wherein said catalyst bed consists of a steam reforming catalyst, and there being source means feeding a mixture of steam and reformable hydrocarbon feedstock to said catalyst for producing hydrogen, and carbon monoxide.

14. The combination of claim 10 wherein said outer shell comprises an axially extending ceramic conduit, and means providing a flame that rises within said conduit and heats same.

15. The combination of claim 10 wherein said apparatus includes an upright outer wall surrounding said upright inner wall and defining a zone to receive said catalyst bed, said zone having a lower entrance to receive inflow of said feed gas, and an outer shell spaced outwardly of said outer wall, and extending over said walls and said burner, the outer shell being relatively removable to provide access to the burner and catalyst bed.

16. The combination of claim 15 wherein the outer shell is spaced from said upright outer wall to define a regenerative heat transfer chamber via which hot product gases flow downwardly about said outer wall, and outlet means for said hot product gases.

17. The combination of claim 15 including a base supporting said inner and outer walls to stand freely, thereby to allow wall expansion and contraction in the vertical direction.

* * * * *